United States Patent [19]

Aguiar et al.

[11] Patent Number: 4,944,282
[45] Date of Patent: Jul. 31, 1990

[54] GRILL APPARATUS

[76] Inventors: Ocasio F. Aguiar; Facundo T. Rodriguez; Raul Fuentes, all of 110 E. 49th St., Hialeah, Fla. 33013

[21] Appl. No.: 455,114

[22] Filed: Dec. 22, 1989

Related U.S. Application Data

[63] Continuation-in-part of Ser. No. 350,090, May 10, 1989.

[51] Int. Cl.$^5$ ............................................. F24B 3/00
[52] U.S. Cl. ........................... 126/25 R; 126/25 AA; 99/395; 99/397; 99/421 H
[58] Field of Search ............. 126/25 R, 25 A, 25 AA; 99/395, 397, 398, 409, 421 H

[56] References Cited

U.S. PATENT DOCUMENTS

| | | | |
|---|---|---|---|
| 3,045,581 | 7/1962 | Bernstein | 99/397 |
| 3,085,500 | 4/1963 | Russell | 126/25 R |
| 3,224,362 | 12/1965 | Kozar | 126/25 R |
| 3,943,837 | 3/1976 | Trkla . | |
| 4,103,606 | 8/1978 | Gitcho | 126/25 R |
| 4,364,310 | 12/1982 | Rufkahr | 99/397 |
| 4,470,343 | 9/1984 | Didier | 126/25 R |
| 4,572,062 | 2/1986 | Widdowson . | |

Primary Examiner—Carroll B. Dority
Attorney, Agent, or Firm—J. Sanchelima

[57] ABSTRACT

A grill apparatus to be used in conjunction with ovens that include a heat source and an upper opening. The grill apparatus is rotably mounted within a support frame that is pivotally mounted to the oven so that it can be brought within the opening and expose it to the heat source or separated from the heat source, as desired. A wire mesh for each one of the two identical grill assemblies is provided to sandwich the foodstuff and hold it securely in place while it is rotated to expose both sides to the heat source. A stopper is provided to keep the support frame assembly in the vertical position and flanges are provided to keep it resting in the horizontal position.

6 Claims, 5 Drawing Sheets

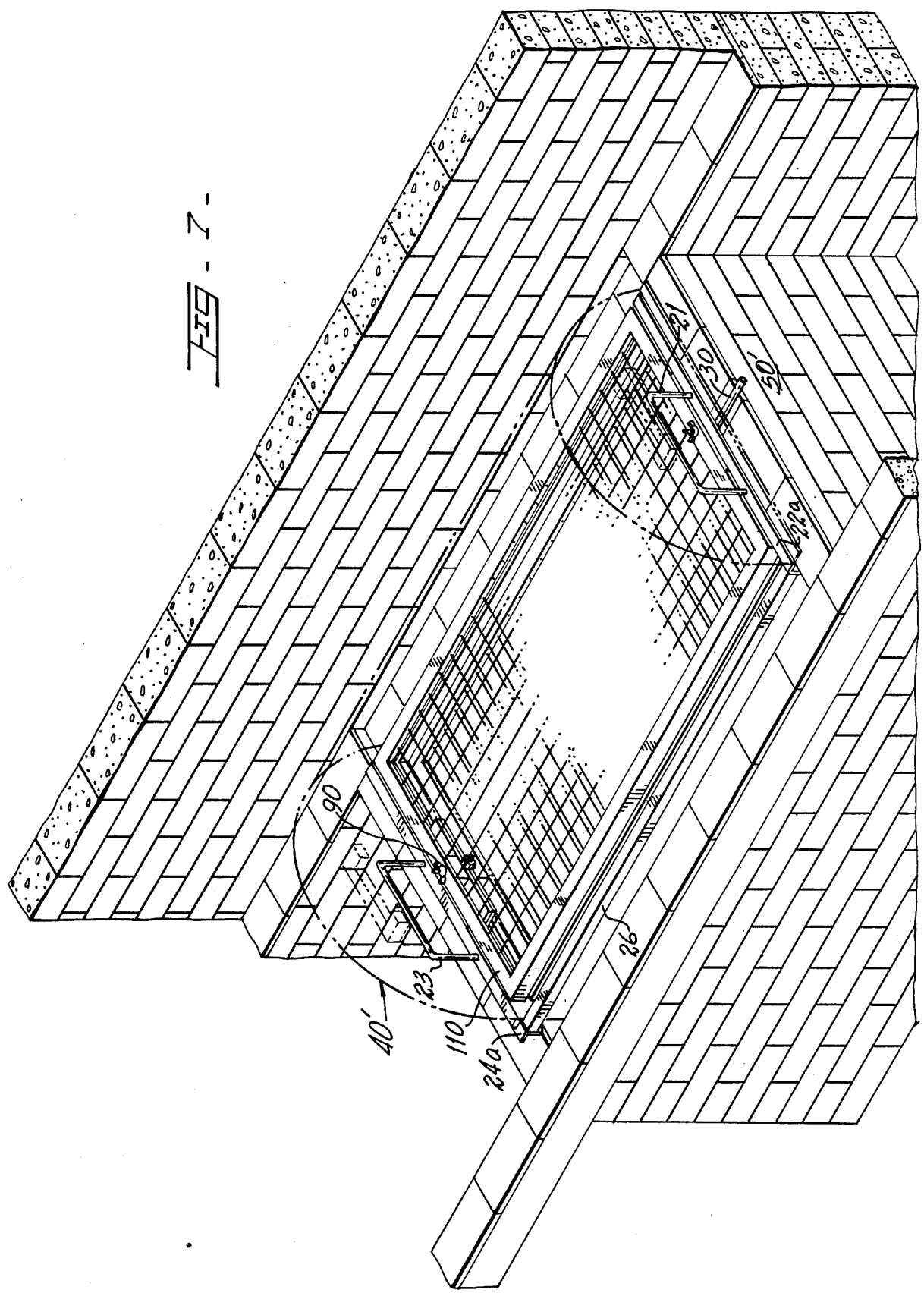

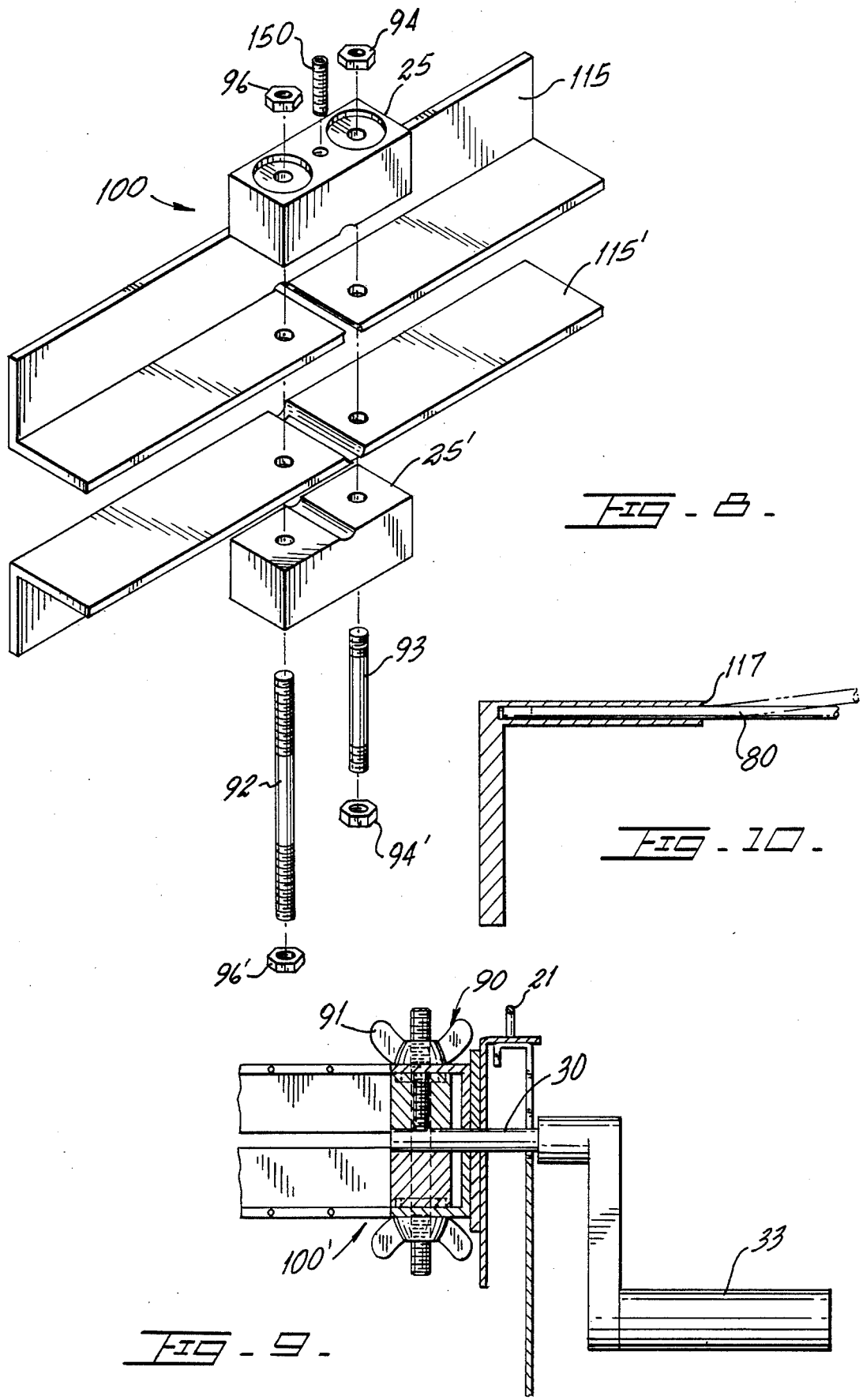

GRILL APPARATUS

OTHER RELATED APPLICATIONS

The present application is a continuation-in-part off pending of U.S. patent application Ser. No. 07/350,090, filed on May 10, 1989, pending which is hereby incorporated by reference.

BACKGROUND OF THE INVENTION

1. Field of the Invention

The present invention relates to grill apparatus for ovens such as barbecue ovens, and more particularly, to such grills that permit a user to rotate the foodstuff being roasted in a barbecue.

2. Description of the Related Art the typical barbecue has a rotating bar such as the one identified with numeral 24 in U.S. Pat. No. 3,943,837 issued to Theodore Trkla in 1976. These bars, however, are not capable of supporting large animals like porks over 50 to 60 lbs. The rotisserie grill described in U.S. Pat. No. 4,572,060 issued to Widdowson shows this limitation in that it specifically states that it is intended for small pigs only and even when rotating spit 75 is used, it requires a rather complicated mechanism to achieve this. To roast these animals a grill (like the one identified with numeral 175 in Widdowson's patent) is usually utilized requiring their periodic turning over. This task involves the handling of a greasy and heavy mass that poses a great inconvenience to the user.

Other patents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a rotating grill apparatus that is mounted over a heat source for readily exposing the foodstuff to the heat on both sides.

It is another object of this present invention to provide a grill apparatus that can handle relatively large animals without requiring the user to use excessive force to cook it and prepare it for serving.

It is still object of this invention to provide a grill apparatus that can be readily adapted to different sizes of barbecues and fire pits.

It is yet another object of this present invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 7 shows a grill apparatus subject of the present invention mounted on a brick oven and having a concave cover represented in phantom.

FIG. 8 is a detailed view isometrically and exploded of the bearing assembly for the shaft that rotably suports the grill apparatus.

FIG. 9 shows a partial cross-sectional view of the bearing assembly taken along line 9—9 in FIG. 4.

FIG. 10 is a detail cross-sectional view of the mesh wire inserted in the frame members of the grills.

DETAILED DESCRIPTION OF THE PREFERRED EMBODIMENT

Figure 1:
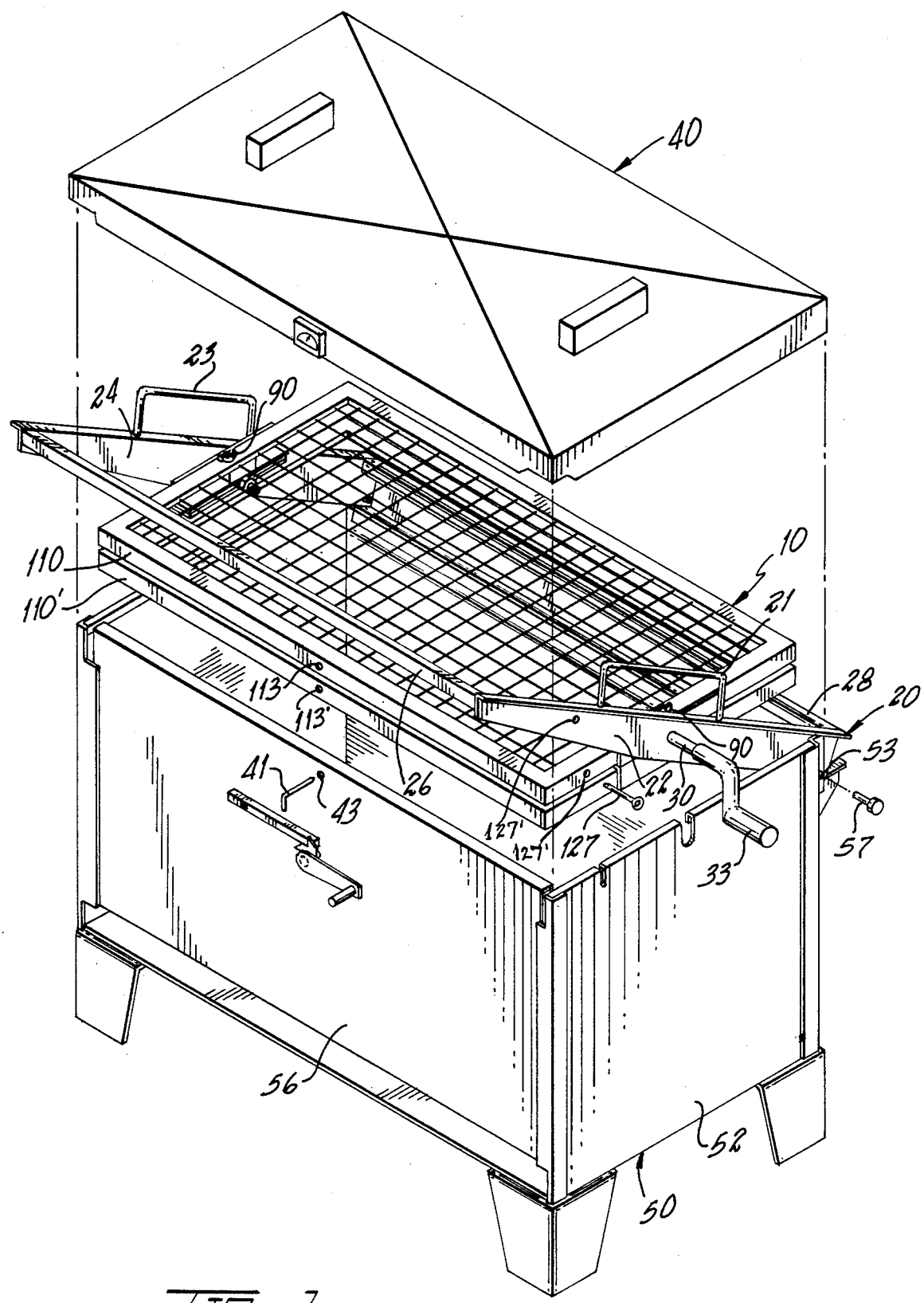
FIG. 1 represents an isometric view of an embodiment for the present invention in a barbecue oven.

Referring now to FIG. 1, where the present invention is generally referred to with numeral 10, it can be observed that it basically includes two identical grill frame assemblies 110 and 110' with fastening mechanisms 90 in bearing assembly 100 urging them toward each other for the purpose of securely sandwiching the foodstuff being cooked. Grills 110 and 110' are rotably mounted within support frame member 20 which in tun is pivotally mounted to the rear of oven 50 which could be a typical barbecue, brick oven or equivalent device. Cover element 40 cooperatively mounts over oven 50 and grill apparatus 10 to preserve the heat being generated from a heat source within oven 50. Cover element 40 needs to be removed before rotating grill apparatus 10 in the embodiment shown in FIG. 1 but a concave cover 40', as the one shown in phantom in FIG. 7 can be used so that grill apparatus 10 can be rotated without requiring the removal of the cover. Locking pin 41 is inserted through opening 43 protruding inside assemblies 110 or 110' through locking holes 113 or 113' thereby maintaining the grill assemblies locked in place.

Figure 2:
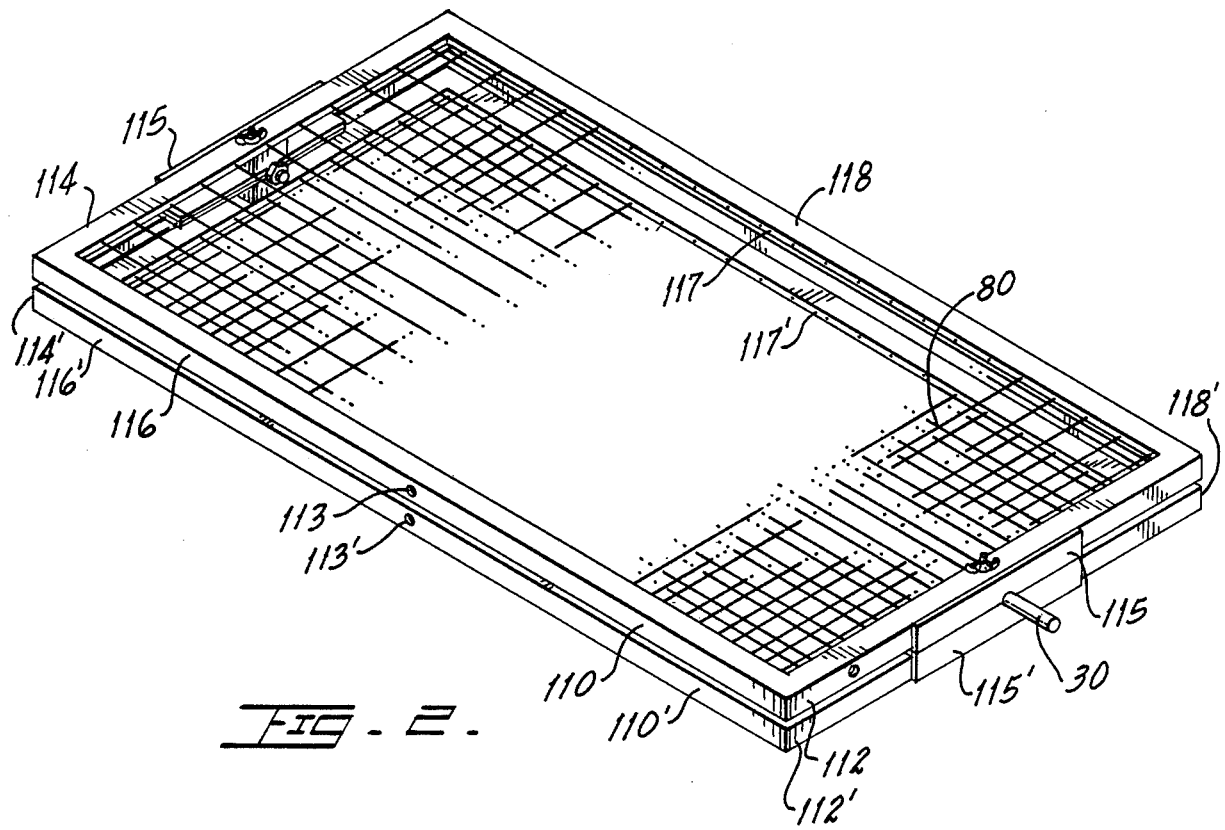
FIG. 2 shows an isometric view of the grill apparatus subject of the present appliction.
Figure 3:
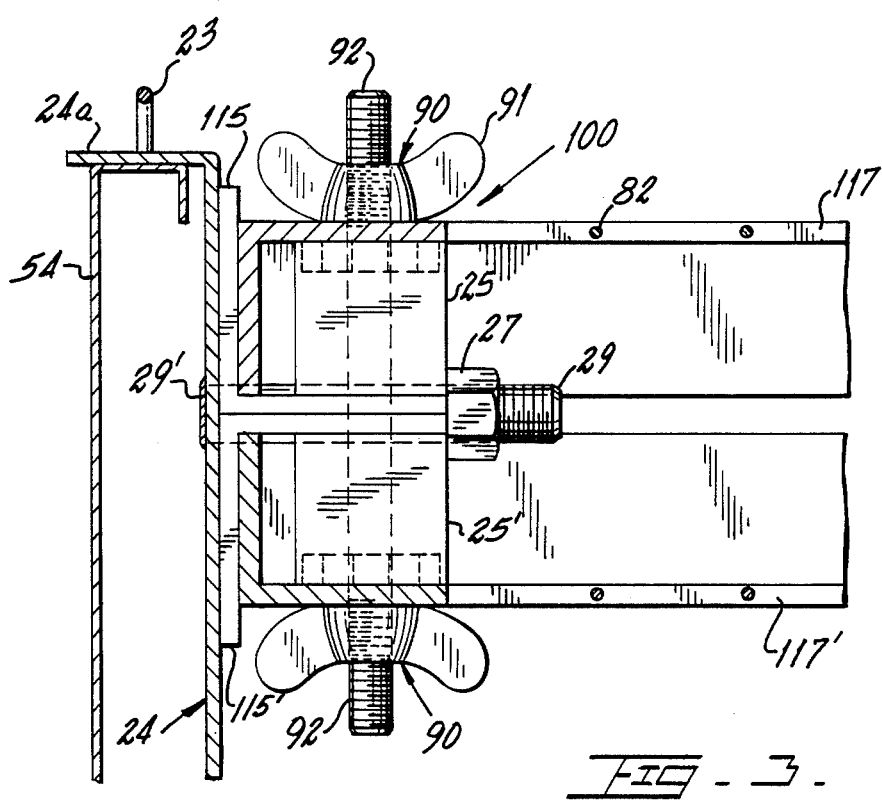
FIG. 3 illustrates a partial detailed view taken along line 3—3 in FIG. 4 of rotation mechanism used in a preferred embodiment for the grill.
Figure 4:
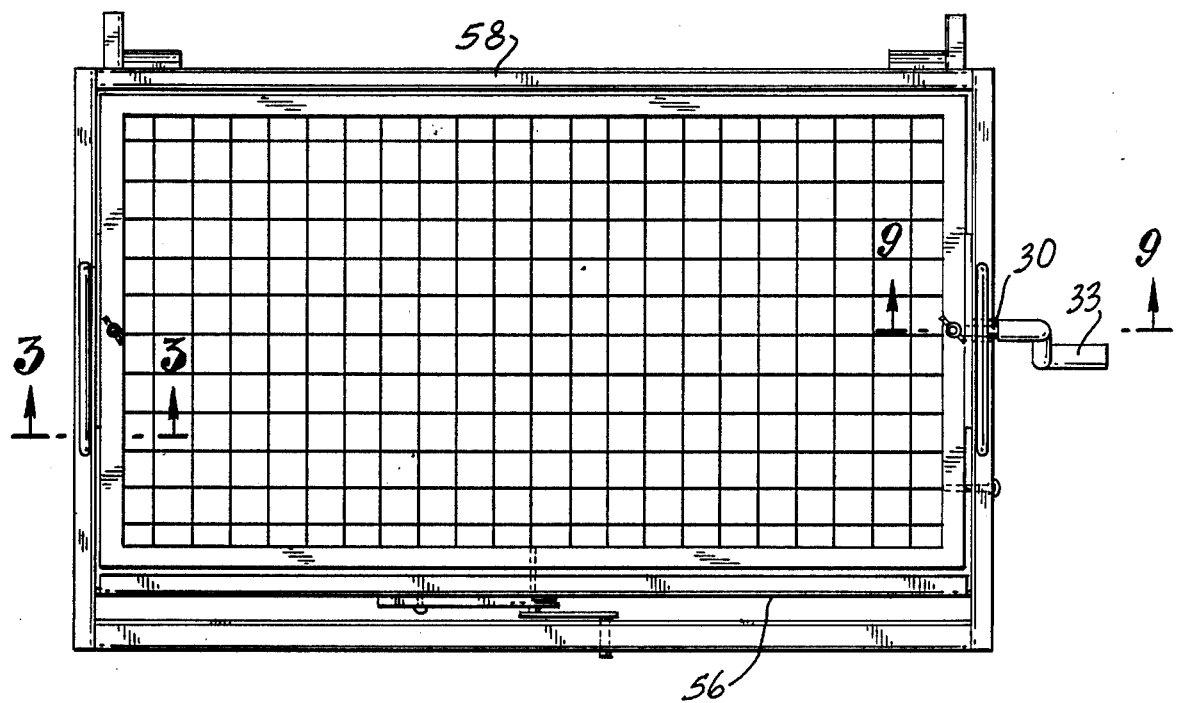
FIG. 4 is a representation of top view of the grill apparatus mounted within a barbecue oven.

As best seen in FIGS. 2; 3 and 4, grill apparatus 10 comprises two identical grill frame assemblies 110 and 110' and including grill frame members 112; 112'; 114; 114'; 116; 116'; 118 and 118'. Mesh steel wire 80 is utilized in a criss-crossed and interwoven fashion with small enough separation to hold most of the food stuff items to be cooked, such as pigs, chicken, steaks, etc. Wire 80 is inserted inside openings 82 located on internal flange 117 and 117' of the grill frame members 110 and 110'. As best seen in figure 10, wire 80 slidably enters opening 82 and it travels slightly in and out depending on how bulky the foodstuff trapped between grill members 110 and 110' is. Wire 50 is substantially rigid and it preferably has a diameter of 0.125 inches. Other diameters may be used specially if the size of the grill increases then the diameter of wire 80 must also be increased. Fastening mechanisms 90 on both ends of the grill frame assemblies 110 and 110' keep the latter securely towards each other and separated only by the food items trapped in between. Wire 80 gives in slightly when the food items are placed between grill frame assemblies 110 and 110'. Fastening mechanism 90 can be best appreciated in FIG. 3 and it can be seen that it includes, in the preferred embodiment, threaded pin 92 piercing through grill frame assemblies 110 and 110' and using wing nuts 91. Threaded pin 93 is used with nut 94 to hold spacers 25 and 25' towards each other. L-shaped members 115 and 115' with spacer 25 and 25' are used as spacers for the grill assemblies 110 and 110' and are in direct contact with abutting side support frame member 24. Collectively we refer to members 115; 115'; 25; 25' and fastening assembly 90 as bearing assembly 100. Bearing assembly 100 is rotably mounted to partly threaded axle 29. Axle 29 is preferably welded at 29' to member 24. Set screw member 150 holds axle 30 is place.

Figures 5, 6:
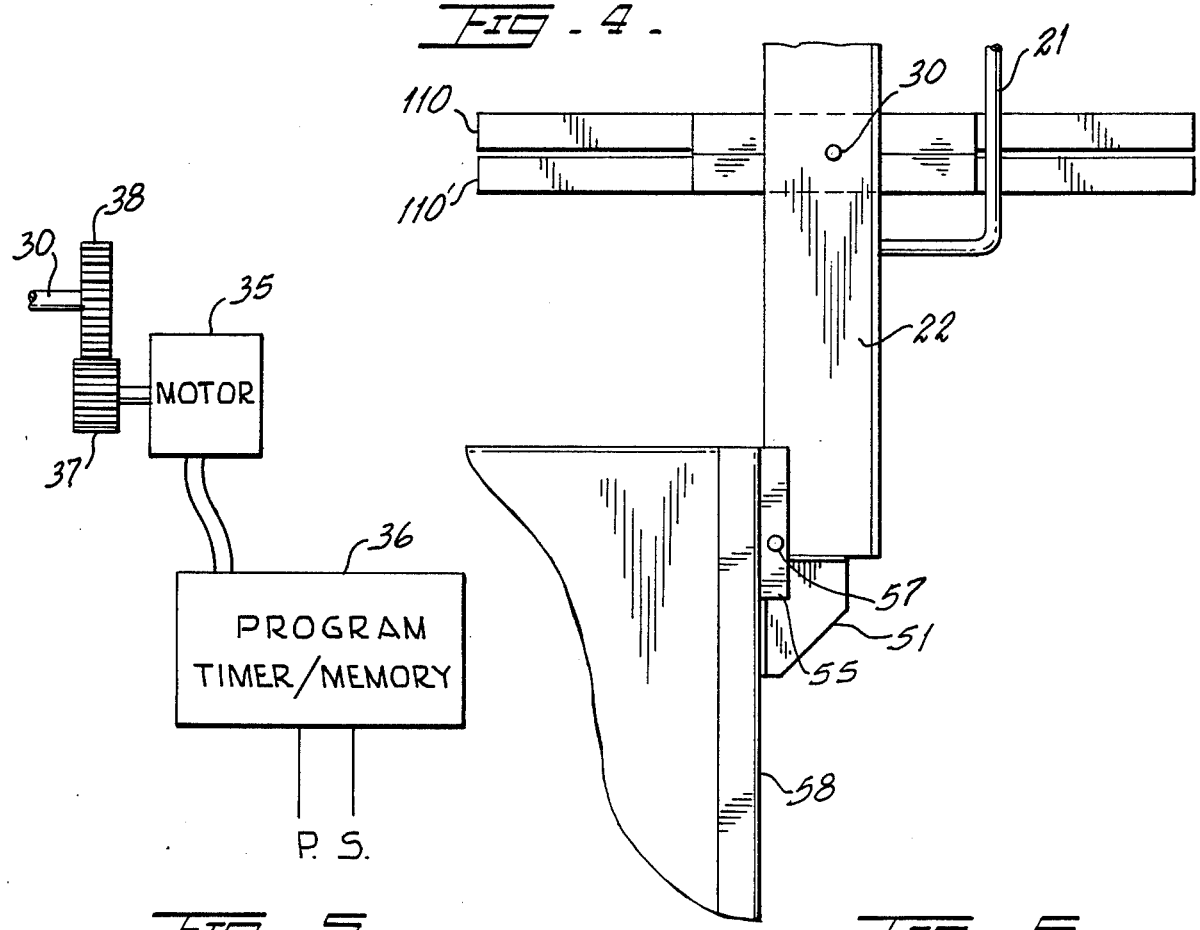
FIG. 5 represents an electro-mechanical schematic of an alternate embodiment for the means that can be used to rotate the grill apparatus.
FIG. 6 shows a partial detail side view of the rear mounting mechanism of the support frame assembly to the oven.

Support frame assembly 20 includes side support frame members 22 and 24, front member 26 and rear member 28. Grill apparatus 10 is rotably mounted within support frame member 20 which is pivotally mounted on the rear of oven 50, as best seen in FIG. 6. Rear extending flange 55 is rigidly mounted on the rear of oven 50 and includes an opening 53 through which removable pivoting pin 57 is inserted. Stopper 51 is mounted to rear wall 58 and is provided to provide support area for support frame assembly 20 when in vertical position. Outwardly extending flange 24a of member 24 rests on the upper end of side wall 52 and 54 of oven 50, or other suitable fixed surface, when support frame member 20 is in the horizontal position. Front wall 56 of oven 50 includes opening 43, which can be located in a number of different places on the upper area. Members 22 and 24 include preferably handle members 21 and 23 to readily remove support frame assembly 20.

On one lateral end of grill apparatus 10, a threaded pin 29 is welded, on one end, to the outer surface of support frame member 24 and extending inwardly along substantially the middle of the center plane between grill assemblies 110 and 110' when mounted against each other. L-shaped members 115 and 115' are provided with cooperating slots 117 and 117' as shown in FIG. 8 to permit pin 29 through. Lock nut 27 loosely maintains bearing assembly 100 in place. Pin 29 is rigidly mounted on side support frame member 24 at 29' and is capable of supporting grill apparatus 10 and L-shaped members 115 and 115'.

As an option, of the two bearing assembly 100 is provided with a mechanism for rotating grill apparatus 10, as shown in FIG. 9. Bearing assembly 100' is similar to the one described above with the exception that it is provided with a crank handle 33, to rotate grill apparatus 10. As shown in FIG. 5, this crank handle coupled to shaft 30 can also be replaced with an electrically actuated mechanism that includes an electric motor 35 that is controlled by a program timer 36 which is connected to a power supply P.S. Motor 35 is coupled to shaft 30 through suitable speed reducing gear assemblies 37 and 38. A user can then program the turning of the foodstuff being cooked, unattended, depending on the nature the of the items being cooked. Program timer 36 can be provided with memory to remember the times required for different recipes. The program timer 36 and associated memory can be implemented with a microprocessor and RAM memory or any other suitable magnetic disk drive as they are conventionally known today. Pin 127 is inserted, as desired through aperture 127' penetrating inside opening 127" when a user wants to hold grill 10 in place with respect to frame assembly 20.

In FIG. 7, a similar arrangement is shown with slight adaptations to a brick oven. The same support frame assembly 20 is used and it rests, in the horizontal position, over a suitable abutting surface by cooperatively extending flanges 22a and 24a outwardly. Also, sufficient clearance must be provide for crank handle 30 to protrude through brick oven 50'.

Pin 41 is used to lock in place either grill member 113 or 113', depending of which one is on the bottom. When grill 113 is removed to remove the foodstuff being cooked, then grill member 113' is kept in place.

It is believed the foregoing description conveys the best understanding of the objects and advantages of the present invention. Different embodiments may be made of the inventive concept of this invention. It is to be understood that all matter disclosed herein is to be interpreted merely as illustrative, and not in a limiting sense.

What is claimed is:

1. A grill apparatus for cooking foodstuff mounted over a heat source in an oven that includes opening on its upper end and a cover and said oven having rear, front and side ends, comprising:

A. support frame means pivotally mounted to the rear of said oven and over said opening further including lateral sides that have outwardly extending flanges that come in contact with the adjacent side ends of said oven thereby resting thereon when in horizontal position; and B. two grill assemblies having fastening means urging them toward each other and said grill assemblies being rotably mounted within said support frame means so that said foodstuff is sandwiched between said two grill assemblies and can be readily exposed to said heat source on both sides and said grill assemblies include steel wire means disposed in criss-crossed fashion with sufficiently small separation to hold the foodstuff top be cooked in place and wherein said grill assemblies include means for providing rotational movement from outside the oven to said grill assemblies.

2. The grill apparatus set forth in claim 1 wherein said grill assemblies include locking means for maintaining them securely in a horizontal position with said oven.

3. The grill apparatus set forth in claim 2 wherein said cover has a sufficiently large concavity to permit the rotation of said grill assemblies within said oven with said cover on.

4. The grill apparatus set forth in claim 3 wherein said means for providing rotational movement to said grill assemblies include a crank shaft.

5. The grill apparatus set forth in claim 4 wherein said means for providing rotational movement to said grill assemblies includes an electric motor.

6. The grill apparatus set forth in claim 1 wherein each of said grill assemblies includes a rectangular frame means having four frame members including each internal flanges further including a plurality of openings that cooperatively receive said steel wire means so that said steel wire means move inside said openings in and out depending on the volume of said foodstuff sandwiched between said grill assemblies.

* * * * *